United States Patent
Fink et al.

(10) Patent No.: US 9,749,528 B1
(45) Date of Patent: Aug. 29, 2017

(54) MULTI-STAGE WAKEUP BATTERY-POWERED IP CAMERA

(71) Applicant: Ambarella, Inc., Santa Clara, CA (US)

(72) Inventors: Alexander Fink, San Jose, CA (US); Shimon Pertsel, Mountain View, CA (US)

(73) Assignee: Ambarella, Inc., Santa Clara, CA (US)

( * ) Notice: Subject to any disclaimer, the term of this patent is extended or adjusted under 35 U.S.C. 154(b) by 55 days.

(21) Appl. No.: 14/736,638

(22) Filed: Jun. 11, 2015

(51) Int. Cl.
*H04N 5/232* (2006.01)
*G06F 1/32* (2006.01)

(52) U.S. Cl.
CPC ....... *H04N 5/23241* (2013.01); *G06F 1/3203* (2013.01); *G06F 1/3206* (2013.01); *G06F 1/3231* (2013.01)

(58) Field of Classification Search
CPC . H04N 5/23241; G06F 1/3203; G06F 1/3231; G06F 1/3206; G06F 1/206
See application file for complete search history.

(56) References Cited

U.S. PATENT DOCUMENTS

| | | | | |
|---|---|---|---|---|
| 5,915,069 | A * | 6/1999 | Nishijima | H04N 5/772 348/143 |
| 8,230,246 | B1 * | 7/2012 | Sharkey | G06F 1/1626 345/158 |
| 2001/0031129 | A1 * | 10/2001 | Tajima | H04N 5/782 386/241 |
| 2009/0259865 | A1 * | 10/2009 | Sheynblat | G06F 1/3203 713/323 |
| 2009/0295919 | A1 * | 12/2009 | Chen | H04N 7/18 348/143 |
| 2010/0265344 | A1 * | 10/2010 | Velarde | H04N 5/232 348/208.16 |
| 2011/0081160 | A1 * | 4/2011 | Yoon | G03G 15/80 399/88 |
| 2012/0096290 | A1 * | 4/2012 | Shkolnikov | G06F 1/325 713/320 |
| 2012/0147531 | A1 * | 6/2012 | Rabii | H04W 52/0254 361/679.01 |
| 2014/0032880 | A1 * | 1/2014 | Ka | G06F 9/3885 712/30 |
| 2014/0208333 | A1 * | 7/2014 | Beals | G06F 9/542 719/318 |
| 2014/0267811 | A1 * | 9/2014 | Bhat | H04N 5/23241 348/208.16 |

(Continued)

*Primary Examiner* — Abdelaaziz Tissire
(74) *Attorney, Agent, or Firm* — Christopher P. Maiorana, PC

(57) ABSTRACT

An apparatus comprising a first sensor, a second sensor, a processor and a controller. The first sensor may generate a first signal in response to a first type of activity. The second sensor may generate a second signal in response to a second type of activity. The processor may be configured to operate in one of a plurality of power consumption stages. The first power consumption stage waits for a wakeup signal. The second power consumption stage captures a video signal of a targeted view of an environment. The controller may be configured to generate a first intermediate signal if the first type of activity is detected. The controller may generate the wakeup signal if the first intermediate signal is present and the second signal relates to the first signal. The wakeup signal may activate one or more power consuming video processing features of the processor.

20 Claims, 6 Drawing Sheets

(56) References Cited

U.S. PATENT DOCUMENTS

2015/0206415 A1\* 7/2015 Wegelin ............... G08B 21/245
340/573.4
2016/0006988 A1\* 1/2016 Zhao ...................... H04N 7/181
348/155

\* cited by examiner

MULTI-STAGE WAKEUP BATTERY-POWERED IP CAMERA

FIELD OF THE INVENTION

The present invention relates to power saving generally and, more particularly, to a multi-stage wakeup battery-powered IP camera.

BACKGROUND OF THE INVENTION

Battery-powered IP/surveillance cameras have a very limited power budget and, therefore, cannot record all the time. To preserve power, battery-powered IP/surveillance cameras have a particular off/on duty cycle that allows the camera to record only when something interesting is happening in the field of view of the camera.

Currently available cameras control a duty cycle using a mounted passive infrared (PIR) sensor with a small microcontroller unit (MCU) attached. The camera sensor and processor remain off and only the PIR and MCU are on in the normal case. When the PIR is triggered by motion, the MCU wakes up the camera processor, which initializes the camera sensor and starts recording.

One problem is that PIR is triggered too often. Sometimes PIR is triggered by trivial events like changes in lighting, wind, or moving tree branches (false motion).

Initializing the camera due to a false motion unnecessarily drains power and wastes resources. Additional strategies involve the use of multiple PIR sensors with varying sensitivities and ranges, the use of a CO2 sensor, and the use of a contact microphone to determine when the camera should exit standby mode and start recording. Each type of sensor has flaws that can result in false positive detections.

It would be desirable to implement a multi-stage wakeup battery-powered IP camera to provide a better hypothesis testing (screening) mechanism in order to minimize the amount of electric power wasted on such false positives.

SUMMARY OF THE INVENTION

The present invention concerns an apparatus comprising a first sensor, a second sensor, a processor and a controller. The first sensor may generate a first signal in response to a first type of activity. The second sensor may generate a second signal in response to a second type of activity. The processor may be configured to operate in one of a plurality of power consumption stages. The first power consumption stage waits for a wakeup signal. The second power consumption stage captures a video signal of a targeted view of an environment. The controller may be configured to generate a first intermediate signal if the first type of activity is detected. The controller may generate the wakeup signal if the first intermediate signal is present and the second signal relates to the first signal. The wakeup signal may activate one or more power consuming video processing features of the processor.

The objects, features and advantages of the present invention include providing a multi-stage wakeup battery-powered IP camera that may (i) conserve power, (ii) confirm a suspected activity, (iii) prevent false positive detection, (iv) implement multiple sensor types, (iv) perform video analytics, (v) determine whether an activity is in a field of view of a camera, (vi) implement directional audio detection, (vii) implement various confirmation thresholds and/or (viii) be easy to implement.

BRIEF DESCRIPTION OF THE DRAWINGS

These and other objects, features and advantages of the present invention will be apparent from the following detailed description and the appended claims and drawings in which:

DETAILED DESCRIPTION OF EMBODIMENTS

Figure 1:
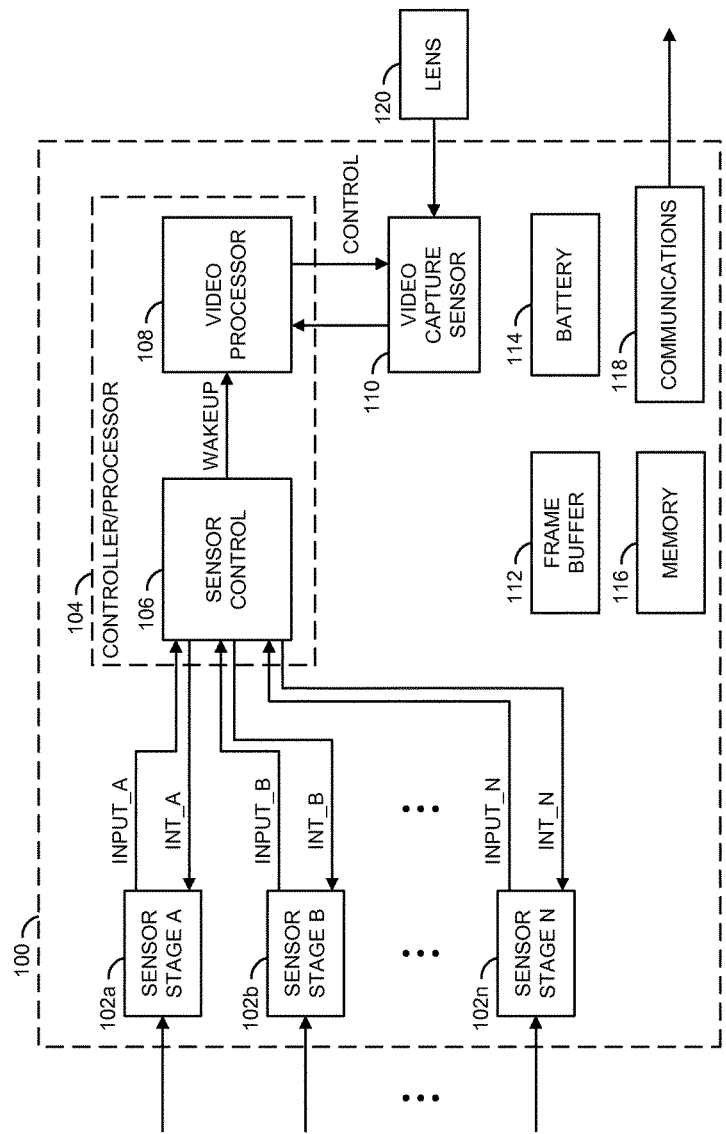
FIG. 1 is a block diagram of an example embodiment of an apparatus in accordance with the present invention.

Referring to FIG. 1, a block diagram of an example embodiment of an apparatus 100 in accordance with the present invention is shown. The apparatus 100 may be a multi-stage wakeup battery-powered IP camera system. The camera system 100 may comprise blocks (or circuits) 102a-102n, a block (or circuit) 104, a block (or circuit) 106, a block (or circuit) 108, a block (or circuit) 110, a block (or circuit) 112, a block (or circuit) 114, a block (or circuit) 116, a block (or circuit) 118 and/or a block (or circuit) 120. The circuits 102a-102n may be configured as sensor stages. The circuit 104 may be configured as a controller/processor. The circuit 106 may be configured as a sensor control. The circuit 108 may be configured as a video processor. The circuit 110 may be configured as a video capture sensor. The circuit 112 may be configured as a frame buffer. The circuit 114 may be configured as a battery. The circuit 116 may be configured as a memory. The circuit 118 may be configured as a communications module. The number, types and arrangement of the components of the camera system 100 may be varied according to the design criteria of a particular implementation.

The sensor stages 102a-102n may be configured to detect and/or measure an environment near the camera system 100. Each of the sensor stages 102a-102n may comprise one or more sensor types. The type of sensors in each of the sensor stages 102a-102n may allow the camera system 100 to detect a particular type of activity. Each of the sensor stages 102a-102n may be operational to detect one or more different types of activities.

Each of the sensor stages 102a-102n are shown receiving an input from the environment (e.g., an observed activity). Each of the sensor stages 102a-102n are shown generating a corresponding signal (e.g., INPUT_A, INPUT_B, ..., INPUT_N). The signals INPUT_A-INPUT_N may be generated in response to the observed activity. For example, the sensor stage 102a may be configured to detect an activity using a PIR sensor. The observed activity may be movement. The PIR sensor may detect the movement (e.g., the observed activity) and generate the signal INPUT_A. In some embodiments, the sensor stages 102a-102n may share some of the sensors and/or sensor types. For example, the sensor stage 102a may implement an audio sensor, such as a microphone, to detect changes in volume level and the sensor stage 102b may utilize signals received from the microphone to determine audio location. The number of sensors in each of the sensor stages 102a-102n and/or the type of activity detected may be varied according to the design criteria of a particular implementation.

The sensor stages 102a-102n are shown receiving corresponding intermediate signals (e.g., INT_A-INT_N). The intermediate signals INT_A-INT_N may be configured to activate (or wakeup) the sensor stages 102a-102n. For example, the sensor stage 102a may operate in an active mode while the sensor stages 102b-102n may operate in a standby mode. The sensor stage 102a may remain active. Each of the sensor stages 102b-102n may enter the active mode upon receiving the corresponding intermediate signal. For example, the sensor stage 102b may enter the active mode upon receiving the signal INT_B.

A wakeup sequence of the camera system 100 may be performed in multiple stages. Generally, the sensor stage 102a may be in an active state (e.g., the sensor stage 102a remains active during the operation of the camera system 100). When one of the sensor stages 102a-102n detects a "suspected activity" one of the input signals may be generated. For example, when the sensor stage 102a detects a "suspected activity", the sensor stage 102a may generate the signal INPUT_A. Each subsequent stage may have a higher hypothesis testing capability (e.g., a confirmation threshold) for determining whether a false motion (or false positive detection) has occurred. Each subsequent stage may have a slightly higher power consumption than a previous stage. The number of stages, the power consumption of each sensor stage and/or the type of testing (confirmation threshold) of each sensor stage may be varied according to the design criteria of a particular implementation.

The controller/processor 104 may be comprised of the sensor control 106 and/or the video processor 108. In some embodiments, the controller/processor 104 may be implemented as a single component (e.g., chip, package, etc.). In some embodiments, the sensor control 106 and the video processor 108 may be separate components. The sensor control 106 may be implemented as a low power consumption circuit. For example, when the video processor 108 operates at a full functionality, the sensor control 106 may consume less power than the video processor 108.

The sensor control 106 may be configured to receive the input signals INPUT_A-INPUT_N. The sensor control 106 may be configured to generate the intermediate signals INT_A-INT_N in response to the input signals INPUT_A-INPUT_N. For example, the sensor stage 102a may present the input signal INPUT_A (e.g., in response to a detected activity) to the sensor control 106. In response, the sensor control 106 may generate and present the intermediate signal INT_B to the sensor stage 102b (e.g., to wakeup/activate the sensor stage 102b). The intermediate signals INT_A-INT_N may operate as wakeup signals for the corresponding sensor stages 102a-102n.

The sensor control 106 may be configured to generate a wakeup signal (e.g., WAKEUP). The sensor control 106 may present the wakeup signal WAKEUP to the video processor 108. The wakeup signal WAKEUP may be generated by the sensor control 106 when the input signals INPUT_A-INPUT_N from the sensor stages 102a-102n are determined to be related. The input signals INPUT_A-INPUT_N may be related when the activities and/or objects detected by the sensor stages 102a-102n meet a confirmation threshold for detecting the activities and/or objects. For example, the activities and/or objects detected by the second sensor stage 102b may confirm the suspected activities and/or objects detected by the first sensor stage 102a. The confirmation threshold may be pre-configured to avoid false wakeups for the components of the camera system 100.

The wakeup signal WAKEUP may be configured to activate one or more components (e.g., functionality, power stages) of the video processor 108. In some embodiments, the signal WAKEUP may activate partial functionality of the video processor 108 (e.g., a first power stage). In some embodiments, the signal WAKEUP may activate full functionality of the video processor 108 (e.g., a second power stage, a third power stage, etc.). The power stages may be ordered (e.g., organized to have an order of activation) based on the power consuming video processing features of the video processor 108. Generally, the signal WAKEUP activates one or more power consuming video processing features of the video processor 108.

The video processor 108 may be configured to execute computer readable code and/or process information. The video processor 108 may be configured to receive input and/or present output to the memory 116. The video processor 108 may be configured to present and/or receive other signals (not shown). The video processor 108 may be configured to implement machine-vision and/or video analysis to detect and/or classify objects/activities. The video processor 108 may be configured to analyze video to locate the objects/activities.

The video processor 108 may be configured to capture a video signal of a targeted view of the environment. For example, the video processor 108 may be a video processor for a digital camera (e.g., a video camera and/or a still camera). The video processor 108 may control the video capture sensor 110 and/or receive data from the video capture sensor 110. The video processor 108 may have one or more power stages. Each of the power stages of the video processor 108 may activate one or more of the power consuming features of the video processor 108. The number of power stages and/or the power consuming video processing features of each of the power stages may be varied according to the design criteria of a particular implementation.

For example, in a first power stage the video processor 108 may wait for the wakeup signal (e.g., WAKEUP and/or one of the signals INT_A-INT_N). When the video processor 108 is in the first power stage (e.g., an idle stage and/or a standby stage), the video processor 108 may consume a low amount of power (e.g., no power consumption and/or a minimal amount of power consumption used to allow the video processor 108 to respond to received signals). In another example, in a second power stage the video processor 108 may capture the video signal of the targeted view of the environment.

Other power stages may be implemented. For example, in one power stage the video processor 108 may be configured to analyze regions (or portions) of a video frame. The analysis may detect objects in particular regions of the video frame. In another example, while in one of the power stages the video processor 108 may be configured to analyze full video frames. The analysis of the full video frames may detect and/or recognize particular objects in full video frames. Performing video processing on a region of the video frame may reduce power consumption when compared to full video frame analysis. Other power consuming video processing features of the video processor 108 may comprise video recording, network streaming and/or encryption.

In some embodiments, the video processor 108 may be part of one or more of the sensor stages 102a-102n. For example, the first power stage of the video processor 108 may perform analytics (e.g., video processing) on a region of video frames. The analytics performed on the region of the video frames may be configured to detect for an activity. If the analytics performed by the video processor 108 on the region of the video frames is determined to pass the confirmation threshold then one of the intermediate signals INT_A-INT_N may be generated. One or more of the signals INT_A-INT_N and/or the signal WAKEUP may activate one or more power consuming video processing features of the video processor 108.

The video capture sensor 110 may receive light from the lens 120 and transform the light into digital data (e.g., a bitstream). For example, the sensor 110 may perform a photoelectric conversion of the light from the lens 120. The video processor 108 may transform the bitstream into human-legible content (e.g., video data). For example, the video processor 108 may receive pure (e.g., raw) data from the sensor 110 and generate (e.g., encode) video data based on the raw data (e.g., the bitstream).

The frame buffer 112 may be configured to store the raw data and/or the processed bitstream. For example, the frame buffer 112 may store (e.g., provide temporary storage and/or cache) one or more of the video frames (e.g., the digital video signal). The video processor 108 may perform analysis on the video frames stored in the frame buffer 112. The camera system 100 may implement a separate internal memory (e.g., a memory separate from the frame buffer 112 such as the memory 116).

The battery 114 may provide power to the camera system 100. The battery 114 is shown as a single component. In some embodiments, multiple batteries (or battery cells) may be implemented for the camera system 100. For example, the sensor stages 102a-102n may each be powered by a separate battery (e.g., the sensor stages 102a-102n may use different voltages). The number of batteries, the voltage of the battery 114 and/or the chemistry of the battery 114 may be varied according to the design criteria of a particular implementation.

The battery 114 may have a limited power supply. The multi-stage architecture of the camera system 100 may reduce a consumption of the power stored in the battery 114. In some embodiments, the battery 114 may be difficult to replace (or recharge) and/or the camera system 100 may not be easily accessed to replace the battery 114. Conservation and/or management of the power supply of the battery 114 may be an important concern.

The memory 116 may store data. The memory 116 may be implemented as a cache, flash memory, frame buffer, DRAM memory, etc. The type and/or size of the memory 116 may be varied according to the design criteria of a particular implementation. The data stored in the memory 116 may correspond to the classification of objects and/or activities. For example, the memory 116 may store reference objects. The objects detected by the video processor 108 when analyzing the video frames in the frame buffer 112 may be compared to the reference objects stored in the memory 116.

In some embodiments, the memory 116 may provide local mass storage for the camera system 100. For example, the memory 116 may be implemented as a hard disk drive and/or a solid state drive. The memory 116 may provide storage for video recording to allow the video processor 108 to record the captured video frames (e.g., in one of the higher power stages).

The communications module 118 may provide a communications capability for the camera system 100. For example, the communications module 118 may provide hard-wired communications (e.g., via Ethernet, USB, HDMI, DisplayPort, etc.). In another example, the communications module 118 may provide wireless communications (e.g., Wi-Fi, cellular, Bluetooth, ZigBee, etc.). The type of protocol implemented by the communications module 118 may be varied according to the design criteria of a particular implementation. In some embodiments, network streaming performed by the communications module 118 may be one of the power consuming video processing features of the video processor 108. In some embodiments, the video processor 108 may perform encryption on the video frames before transmitting the encrypted video frames via the communications module 118. The communications module 118 may transmit the video frames to an external device for mass storage.

The lens 120 (e.g., a camera lens) may be directed at the environment surrounding the camera system 100 (e.g., providing a targeted view of the environment). The lens 120 may be aimed to capture environmental data (e.g., light). The lens 120 may be configured to capture and/or focus the light for the sensor 110. Generally, the sensor 110 is located behind the lens 120. Based on the captured light from the lens 120, the sensor 110 may generate a bitstream and/or video data.

Figure 2:
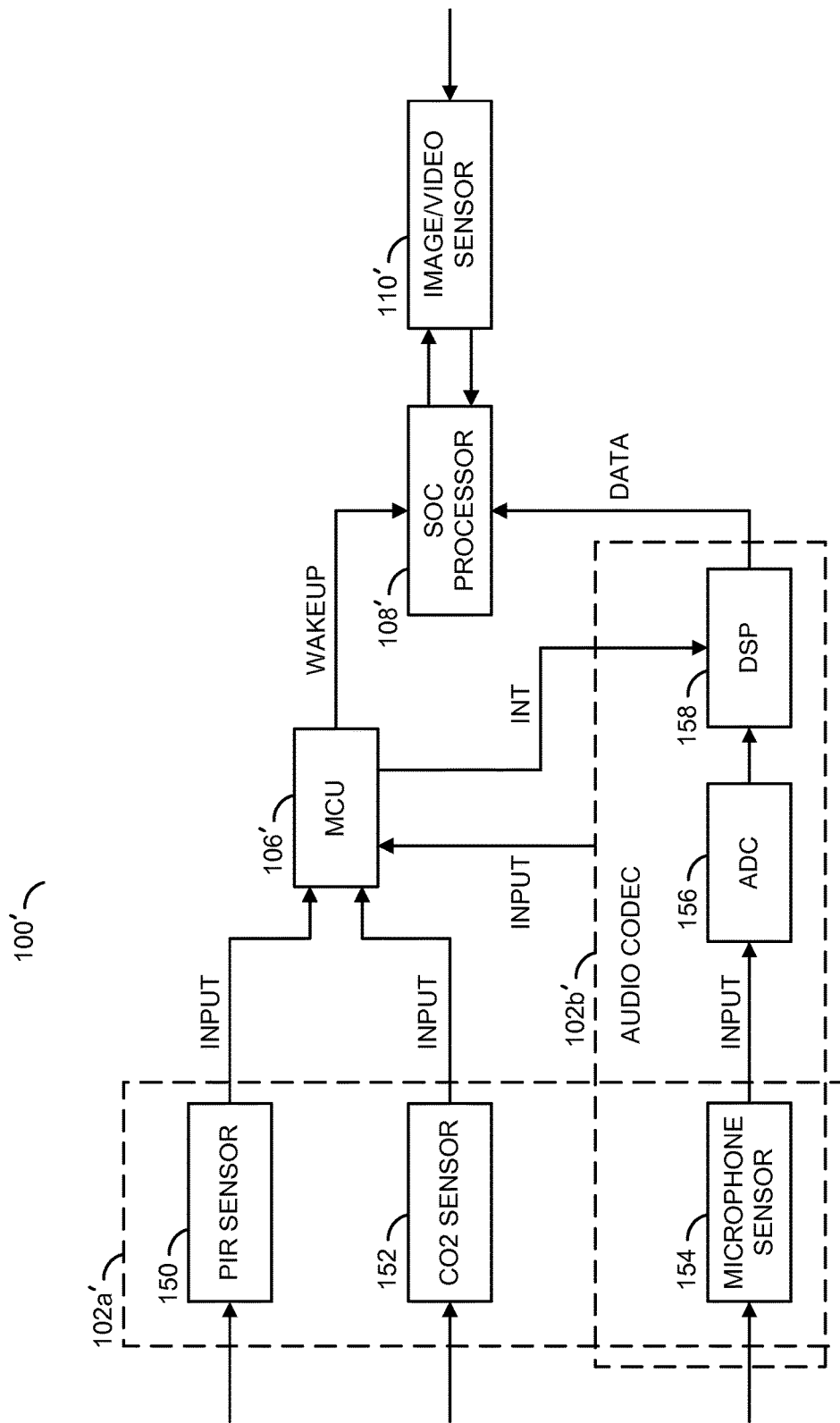
FIG. 2 is a block diagram of another example embodiment of an apparatus.

Referring to FIG. 2, a block diagram of an alternate example embodiment of an apparatus 100' is shown. The apparatus 100' may be an example multi-stage sensor architecture. The example multi-stage sensor architecture 100' is shown comprising the first sensor stage 102a', the second sensor stage 102b', the microcontroller unit (MCU) 106', the system-on-chip (SOC) processor 108' and/or the image/video sensor 110'. The first sensor stage 102a' is shown presenting the signal INPUT to the MCU 106' and/or the second sensor stage 102b'. The MCU 106' is shown presenting the signal INT to the second sensor stage 102b' and the signal WAKEUP to the SOC processor 108'. The second sensor stage 102b' is shown presenting the signal DATA to the SOC processor 108'.

One example of the general architecture of the camera system 100' may be a PIR sensor stage, an audio analytics stage, a local video analytics stage, a full-scale video analytics stage and/or a recording and streaming stage. The first sensor stage 102a' may comprise a block (or circuit) 150, a block (or circuit) 152 and/or a block (or circuit) 154. The circuit 150 may be configured as a PIR sensor. The circuit 152 may be configured as a $CO_2$ sensor. The circuit 154 may be configured as one or more microphone sensors.

The second sensor stage 102b' may comprise the microphone sensor 154, a block (or circuit) 156 and/or a block (or circuit) 158. The circuit 156 may be configured as an audio-to-digital convertor (ADC). The circuit 158 may be configured as a digital signal processor (DSP). Portions of the first sensor stage 102a' and the second sensor stage 102b' are shown overlapping. Some components may be shared between the first sensor stage 102a' and the second sensor stage 102b'. For example, the ADC 156 is shown as part of the second sensor stage 102b' but the ADC 156 is also used as part of the first sensor stage 102a'.

The PIR sensor 150 may be configured to detect motion. For example, the PIR sensor 150 may generate the signal INPUT in response to detected motion. The $CO_2$ sensor 152 may be configured to detect carbon dioxide. For example, the $CO_2$ sensor may generate the signal INPUT in response to a pre-defined amount of carbon dioxide. The microphone sensor 154 may be configured to detect audio signals. For example, the microphone sensor 154 may comprise at least two microphones configured to detect the audio signals from different angles and/or locations. The microphone 154 is shown as part of both the first sensor stage 102*a*' and the second sensor stage 102*b*' (e.g., both the first sensor stage 102*a*' and the second sensor stage 102*b*' utilize the audio signals detected by the microphone sensor 154).

The ADC 156 may convert the detected analog audio signals to digital signals (e.g., to detect changes of a volume level of the audio signals). For example, ADC 156 may generate the signal INPUT in response to a pre-defined volume level. Generally, the audio signals detected by the microphone sensor 154 are present to some extent. Levels above a noise floor of the microphone sensor 154 may be presented as the signal INPUT. The ADC 156 and/or the DSP 158 may be configured to detect changes in the audio signal. For example, the ADC 156 and/or the DSP 158 may detect changes such as volume level (e.g., based on an amplitude of the detected audio wave). In another example, the ADC 156 and/or the DSP 158 may detect changes in a frequency of the detected audio signal (e.g., based on a frequency of the detected audio wave).

The DSP 158 may be configured to determine a location of the audio signal based on the locations of the microphones 154. For example, the DSP 158 may provide a data signal (e.g., DATA) to the SOC processor 108' providing information about the direction and/or location of the audio signals. For example, The ADC 156 may be configured to determine whether a change in volume of an audio signal has reached a pre-defined threshold. The ADC 156 may generate the signal INPUT. In response, the MCU 106' may generate the signal INT to activate the DSP 158. The DSP 158 may be configured to calculate a direction of origin of the detected audio signals.

In another example, the DSP 158 may be configured to beam-form the detected audio signals (e.g., perform signal modifications and/or cancellations) to exclude audio signals corresponding to directions that are not of interest (e.g., audio signals having an origin that is outside the field of view of the lens 120). The ADC 156 may be configured to determine whether a change in volume of the beam-formed audio signals have reached a pre-defined threshold. The ADC 156 may generate the signal INPUT in response to the change in volume of the beam-formed audio signals reaching the pre-defined threshold.

In some embodiments, the DSP 158 may be configured to perform audio analytics. The DSP 158 may filter the detected audio signals based on direction and/or frequency range. The memory 116 may store frequency range data associated with various types of sound (e.g., sound associated with interesting activities and/or objects). For example, the frequency range data may be associated with a typical human voice, a gunshot, glass breaking, wildlife noises and/or calls, vehicle engines, tires squealing, environmental events (such as thunder crashing, volcanic eruptions and/or extreme wind conditions), etc. The DSP 158 may compare the stored frequency range data with the detected audio signals to determine whether an interesting activity and/or object has been detected. The signal INPUT may be generated in response to the audio analytics performed by the DSP 158.

In some embodiments, the memory 116 may store frequency range data associated with various types of sound that are not considered interesting. For example, the frequency range data may be associated with ambient noise (e.g., traffic, background talking, insect noises, low wind conditions, rain, etc.). The DSP 158 may compare the stored frequency range data with the detected audio signals. For example, a volume change above a pre-defined threshold detected by the ADC 156 and/or the DSP 158 may normally trigger the generation of the signal INPUT. However, if the detected audio signal is determined to be ambient noise based on the frequency range, the signal INPUT may not be generated. The amount of frequency range data stored and/or the types of sound associated with the frequency range data may be varied according to the design criteria of a particular implementation.

The audio analytics performed by the DSP 158 may be one of the sensor stages 102*a*'-102*n*'. For example, the audio analytics performed by the DSP 158 may be associated with a confirmation threshold. The confirmation threshold for the audio analytics may be based on how close the detected sound is to a pre-defined sound (e.g., based on a comparison of the detected frequency range to the frequency range data stored in the memory 116). For example, the confirmation threshold for the audio analytics may be based on gunshot detection, aggression detection (e.g., aggression in a human voice), breaking glass detection, etc. The type of confirmation threshold used for audio analytics performed by the DSP 158 may be varied according to the design criteria of a particular implementation.

In some embodiments, the SOC processor 108' may be pre-programmed (e.g., sold as a product for analyzing a particular type of object and/or activity). In some embodiments, the SOC processor 108' may be programmable by a user to allow the user to define a type of object, activity and/or other conditions to define a threshold for activating a wakeup signal (or intermediate signal).

Stage 1 of the multi-stage sensor architecture 100' may operate with the MCU 106' and the first sensor stage 102*a*' powered on. For example, the first sensor stage 102*a*' may comprise the PIR sensor 150, the CO2 sensor 152 and the audio ADC 156. Other components of the camera system 100' may be powered off (or operate in a standby mode). For example, the audio DSP 158 and the entire camera processor 108' may be off (e.g., consuming a minimal amount of power or consuming no power).

When the PIR sensor 150 is trigged, the CO2 sensor 152 is triggered and/or the audio ADC 156 determines whether a change to the detected audio signal (e.g., a change in volume level) is above a certain threshold (or volume increases by a certain amount of decibels), then the intermediate signal INT_A may be generated as a result. The camera system 100' may move to stage 2.

Stage 2 of the multi-stage sensor architecture 100' may activate the second sensor stage 102*b*'. The second sensor stage 102*b*' may comprise the audio ADC 156 and the audio DSP 158 performing audio analytics. For example, the PIR sensor 150, the CO2 sensor 152, the microphone sensor(s) 154, the audio ADC 156, and/or the audio DSP 158 may operate in stage 2. Other components of the camera system 100' may be powered off (or operate in a standby mode). For example, the entire camera processor 108' may be off (e.g., consuming a minimal amount of power or consuming no power).

The audio DSP 158 may calculate the direction of sound (e.g., from multiple microphones). The audio DSP 158 may check whether the location of the detected audio signals (or the detected volume level increase of the audio signals) is within the field of view of the lens 120 (e.g., in front of the camera). If the audio DSP 158 determines the detected audio does not pass the confirmation threshold then the camera system 100' may return to stage 1 (e.g., the MCU 106', and the first sensor stage 102*a*' are powered on and the other components of the camera system 100' may be powered off and/or operate in a standby mode). If the audio DSP 158 determines the detected audio does pass the confirmation threshold then the camera system 100' may move to stage 3.

Stage 3 of the multi-stage sensor architecture 100' may activate portions of the SOC processor 108' and the image/video sensor 110'. For example, the SOC processor 108' may operate with limited functionality in stage 3. The sensor 110' and the processor 108' may read out video frame(s).

The SOC processor 108' may utilize the results of the sound direction calculated by the audio DSP 158 to determine where the suspected activity is with respect to the captured frame(s). To limit power consumption the SOC processor 108' may analyze a region (or portion) of the frame(s) corresponding to the calculated sound location. The region of the frame(s) may be analyzed for activity and/or object detection. If the SOC processor 108' determines the region of the frame(s) do not pass the confirmation threshold (e.g., there is no interesting activity and/or objects in the analyzed region of the frame) then the camera system 100' may return to stage 1 (e.g., the MCU 106', and the first sensor stage 102a' are powered on and the other components of the camera system 100' may be powered off and/or operate in a standby mode). If the SOC processor 108' determines the region of the frame(s) do pass the confirmation threshold (e.g., there is interesting activity and/or objects in the analyzed region of the frame) then the camera system 100' may move to stage 4.

Stage 4 of the multi-stage sensor architecture 100' may activate portions of the SOC processor 108' and the image/video sensor 110'. For example, the SOC processor 108' may operate with full, or nearly full, functionality in stage 4. The sensor 110' and the SOC processor 108' may perform full-scale analytics on entire video frames.

The analysis of the SOC processor 108' may detect for an interesting activity and/or object. For example, the interesting object may be a person, a pet, a vehicle, an event, wildlife, etc. The interesting activity and/or object may be pre-defined. For example, the analytics performed by the SOC processor 108' may be tuned to detect humans. The type of analytics performed and/or the types of interesting activities and/or objects may be varied according to the design criteria of a particular implementation.

If the full-frame analytics performed by the SOC processor 108' do not pass the confirmation threshold (e.g., there is no interesting activity and/or object in the analyzed frame(s)) then the camera system 100' may return to stage 1 (e.g., the MCU 106', and the first sensor stage 102a' are powered on and the other components of the camera system 100' may be powered off and/or operate in a standby mode). If the full-frame analytics performed by the SOC processor 108' do pass the confirmation threshold (e.g., there is interesting activity and/or objects in the analyzed frame(s)) then the camera system 100' may move to stage 5.

Stage 5 of the multi-stage sensor architecture 100' may activate the full, or nearly full, functionality of the multi-stage sensor architecture 100'. For example, the SOC processor 108' and the image/video sensor 110' may operate to perform video recording. The communications module 118 may operate to stream over a network (e.g., via Ethernet, USB, Wi-Fi, Bluetooth, ZigBee, etc.). Other features may be implemented such as encryption. The full functionality of the multi-stage architecture 100' may be varied according to the design criteria of a particular implementation.

Stage 5 of the multi-stage sensor architecture 100' may disable one or more of the sensor stages (e.g., the sensor stages 102a'-102n'). For example, during full video recording, data from the PIR sensor 150 may not be necessary (or useful). Disabling some of the sensor stages may preserve power. The number and/or types of sensors and/or sensor stages disabled when the multi-stage sensor architecture 100' is at full, or nearly full, functionality may be varied according to the design criteria of a particular implementation.

In some embodiments, activating each of the sensor stages 102a-102n may not be necessary (or useful) for all applications. In one example, the sensor stages 102a-102b may provide enough information to satisfy the confirmation threshold for stage 5 (e.g., the sensor stage 102e). In another example, the sensor stages 102a-102b and 102d may provide enough information to satisfy the confirmation threshold for stage 5 (e.g., the sensor stage 102e). Reducing the number of sensor stages that are activated in order to confirm the suspected activity and/or object may improve an efficiency of power consumption.

Figure 3:
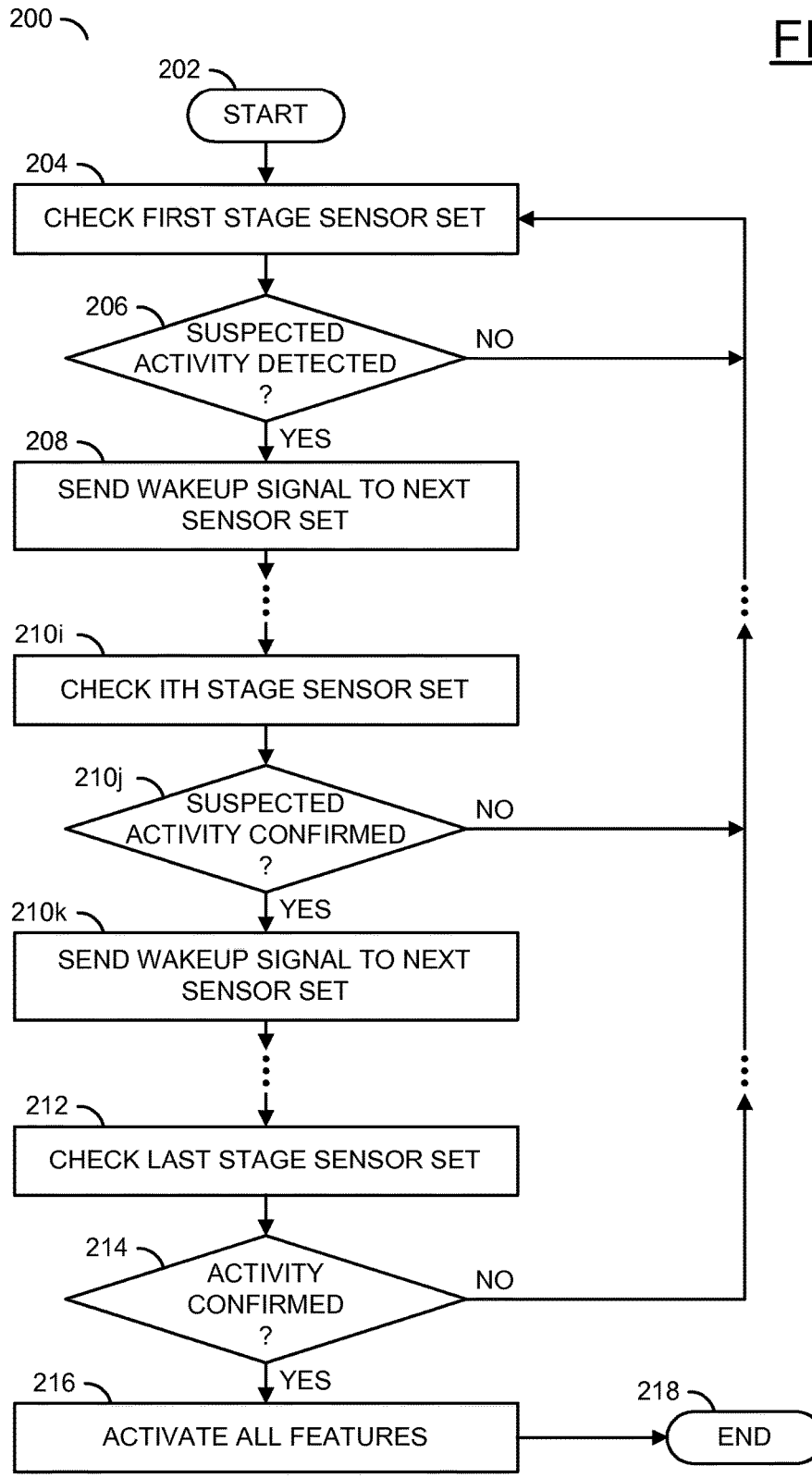
FIG. 3 is a flow diagram illustrating a method for confirming a suspected activity using multi-stage sensors.

Referring to FIG. 3, a method (or process) 200 is shown. The method 200 may confirm a suspected activity using multi-stage sensors. The method 200 generally comprises a step (or state) 202, a step (or state) 204, a decision step (or state) 206, a step (or state) 208, a step (or state) 210i, a decision step (or state) 210j, a step (or state) 210k, a step (or state) 212, a decision step (or state) 214, a step (or state) 216, and a step (or state) 218.

The state 202 may start the method 200. The state 204 may check the first stage sensor set (e.g., the sensor stage 102a). Next, the method 200 may move to the decision state 206. If the decision state 206 determines a suspected activity has not been detected, the method 200 may return to the state 204. If the decision state 206 determines the suspected activity has been detected, the method 200 may move to the state 208. The state 208 may send a wakeup signal to the next sensor set (e.g., send the signal INT_B to the second stage sensor set 102b).

The method 200 may check each subsequent sensor set to confirm the suspected activity. For example, the method 200 may move to the state 210i. The state 210i may check the ith stage sensor set (e.g., the sensor set 102i). Next, the method 200 may move to the decision state 210j. If the decision state 210j determines the suspected activity has not been confirmed, the method 200 may return to the state 204. If the decision state 210j determines the suspected activity has been confirmed, the method 200 may move to the state 210k. The state 210k may send the wakeup signal to the next sensor set (e.g., send the signal INT_J to the jth sensor set 102j).

The method 200 may check each subsequent sensor set 200 until reaching the last stage sensor set at the state 212. The state 212 may check the last stage sensor set (e.g., the sensor set 102n). Next, the method 200 may move to the decision state 214. If the decision state 214 determines the activity has not been confirmed, the method 200 may return to the state 204. If the decision state 214 determines the activity has been confirmed, the method 200 may move to the state 216. The state 216 may activate all features (e.g., the full, or nearly full, functionality of the video processor 108). Next, the method 200 may end at the state 218.

Figure 4:
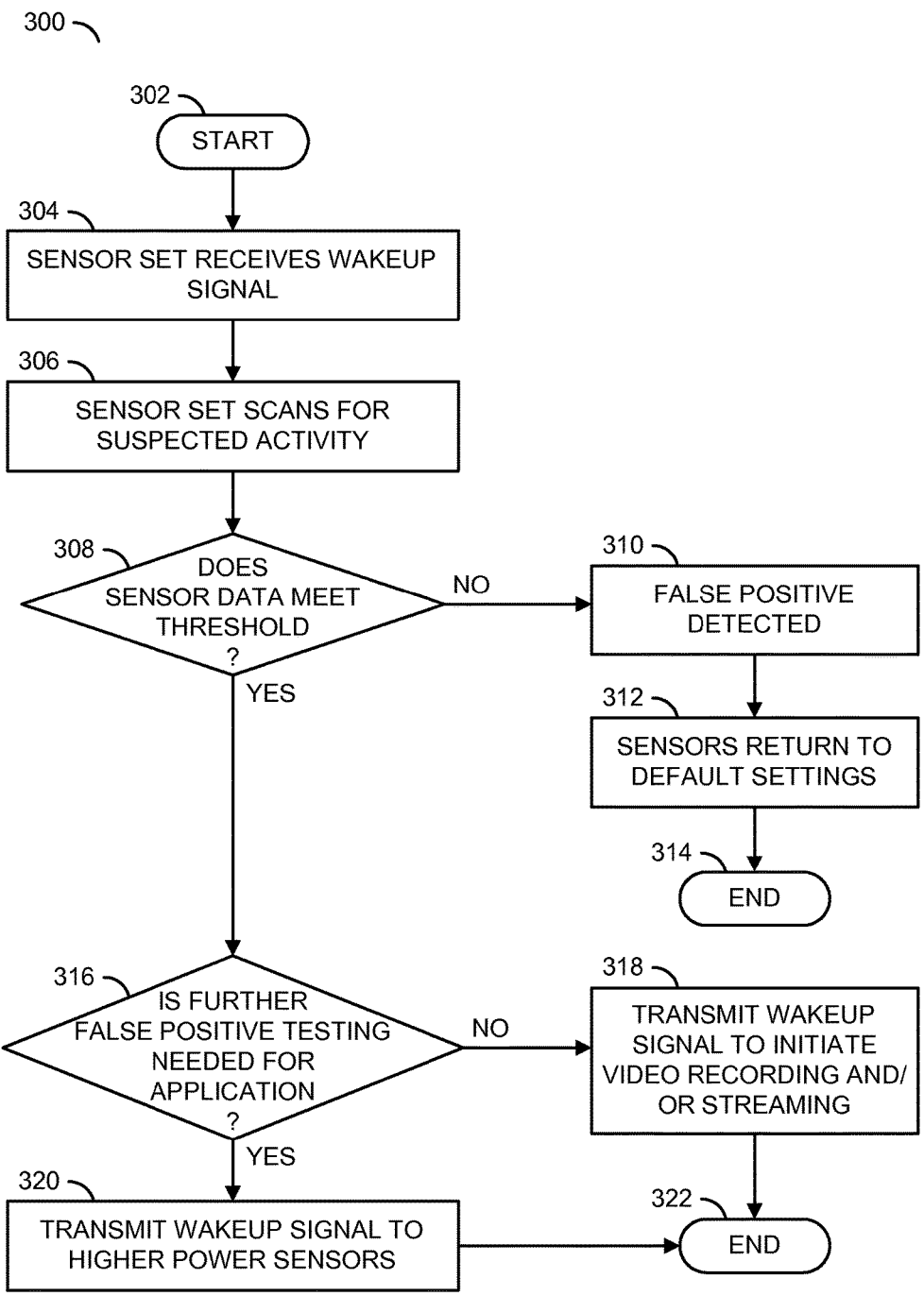
FIG. 4 is a flow diagram illustrating a method for implementing a confirmation threshold.

Referring to FIG. 4, a method (or process) 300 is shown. The method 300 may implement a confirmation threshold. The method 300 generally comprises a step (or state) 302, a step (or state) 304, a step (or state) 306, a decision step (or state) 308, a step (or state) 310, a step (or state) 312, a step (or state) 314, a decision step (or state) 316, a step (or state) 318, a step (or state) 320, and a step (or state) 322.

The state 302 may start the method 300. Next, in the state 304, the sensor set may receive the wakeup signal (or the intermediate signal). In the state 306, the sensor set may scan for the suspected activity. Next, the method 300 may move to the decision state 308.

If the decision state 308 determines the sensor data does not meet the threshold (e.g., the confirmation threshold is not met), the method 300 may move to the state 310. The state 310 may determine a false positive has been detected. Next, in the state 312, the sensors may return to default settings (e.g., a standby state and/or a power state corresponding to the lowest power stage). Next, the method 300 may end at the state 314. If the decision state 308 determines the sensor data does meet the threshold (e.g., the confirmation threshold is met), the method 300 may move to the decision state 316.

If the decision state 316 determines further false positive monitoring testing is not needed for the particular application, the method 300 may move to the state 318. The state 318 may transmit the wakeup signal to initiate video recording and/or streaming (e.g., the full, or nearly full, functionality of the video processor 108). Next, the method 300 may move to the state 322. If the decision state 316 determines further false positive monitoring testing is needed for the particular application, the method 300 may move to the state 320. The state 320 may transmit the wakeup (or intermediate) signal to the higher powered sensor sets. Next, the method 300 may move to the state 322. The state 322 may end the method 300.

Figure 5:
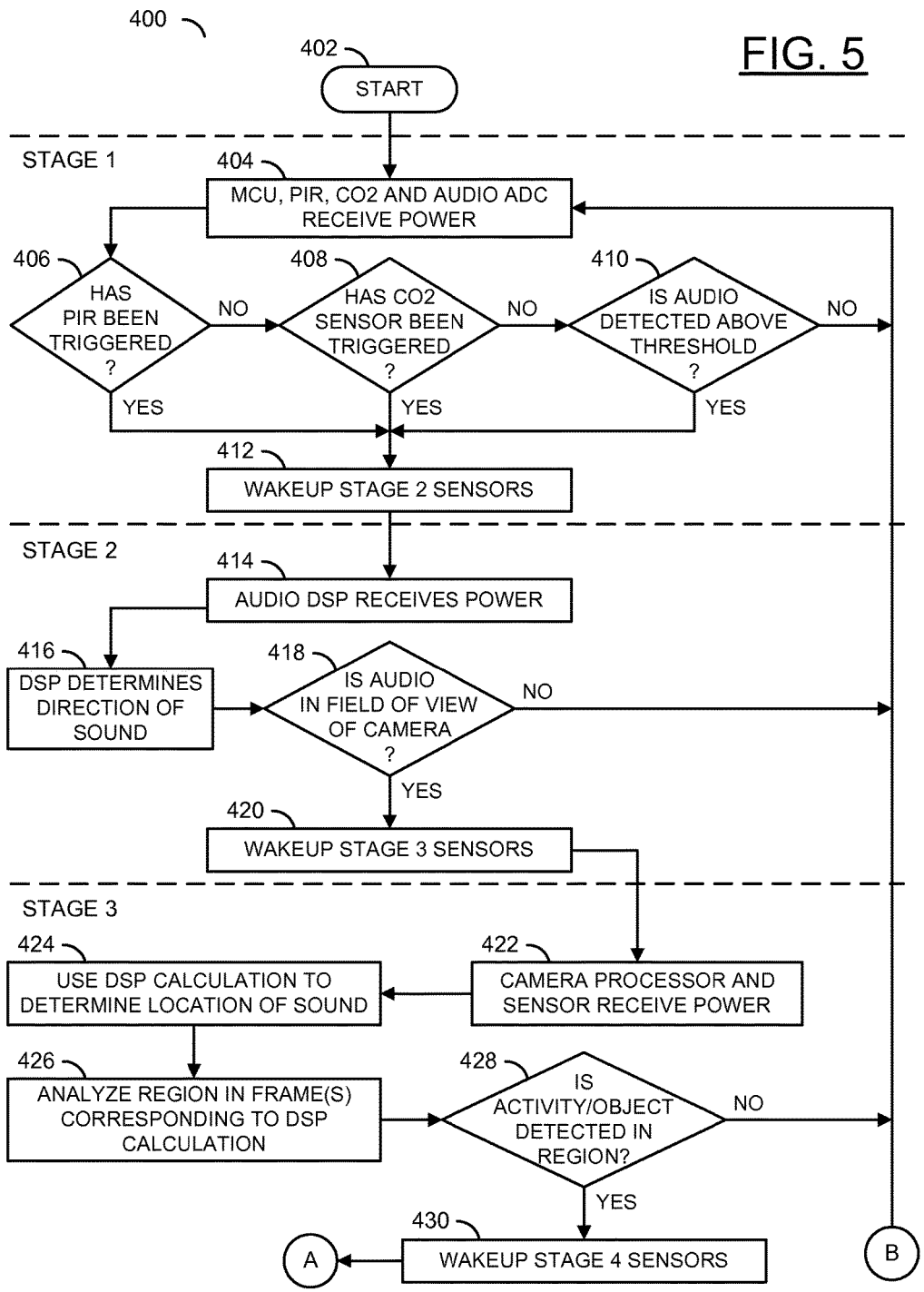
FIG. 5 is a flow diagram illustrating stage 1 through stage 3 of a method for implementing a multi-stage sensor architecture.

Referring to FIG. 5, stage 1 through stage 3 of a method (or process) 400 is shown. The method 400 may implement a multi-stage sensor architecture. Stage 1 through stage 3 of the method 400 generally comprise a step (or state) 402, a step (or state) 404, a decision step (or state) 406, a decision step (or state) 408, a decision step (or state) 410, a step (or state) 412, a step (or state) 414, a step (or state) 416, a decision step (or state) 418, a step (or state) 420, a step (or state) 422, a step (or state) 424, a step (or state) 426, a decision step (or state) 428, and a step (or state) 430.

The state 402 may start the method 400. Next, the method 400 may initiate stage 1 of the multi-stage architecture 100' at the state 404. In the state 404, the MCU 106', the PIR 150, the CO2 sensor 152 and the ADC 156 may receive power (e.g., from the battery 114). Next, the method 400 may move to the decision state 406. If the decision state 406 determines the PIR 150 has been triggered, the method 400 may move to the state 412. If not, the method 400 may move to the decision state 408. If the decision state 408 determines the CO2 sensor 152 has been triggered, the method 400 may move to the state 412. If not, the method 400 may move to the decision state 410. If the decision state 410 determines the audio detected (e.g., by the ADC 156) is above a pre-defined threshold, the method 400 may move to the state 412. If not, the method 400 may return to the state 404. The state 412 may wakeup the stage 2 sensors. Next, the method 400 may move to the state 414.

The method 400 may initiate stage 2 of the multi-stage architecture 100' at the state 414. In the state 414, the audio DSP 158 may receive power (e.g., from the battery 114). In the state 416, the DSP 156 may determine the direction of the sound. Next, the method 400 may move to the state 418. If the decision state 418 determines the audio is not within the field of view of the camera (e.g., the lens 120), the method 400 may return to stage 1 at the state 404. If the decision state 418 determines the audio is within the field of view of the camera (e.g., the lens 120), the method 400 may move to the state 420. The state 420 may wakeup the stage 3 sensors. Next, the method 400 may move to the state 422.

The method 400 may initiate stage 3 of the multi-stage architecture 100' at the state 422. In the state 422, the SOC processor 108' and the sensor 110' may receive power (e.g., from the battery 114). Next, the state 424 may use the calculation from the DSP 156 to determine the location of the sound (e.g., within the video frame). The state 426 may analyze the region of the video frame(s) corresponding to the calculation of the DSP 156. Next, the method 400 may move to the decision state 428. If the decision state 428 determines the activity/object is not detected in the region, the method 400 may return to stage 1 at the state 404. If the decision state 428 determines the activity/object is detected in the region, the method 400 may move to the state 430. The state 430 may wakeup the stage 4 sensors.

Figure 6:
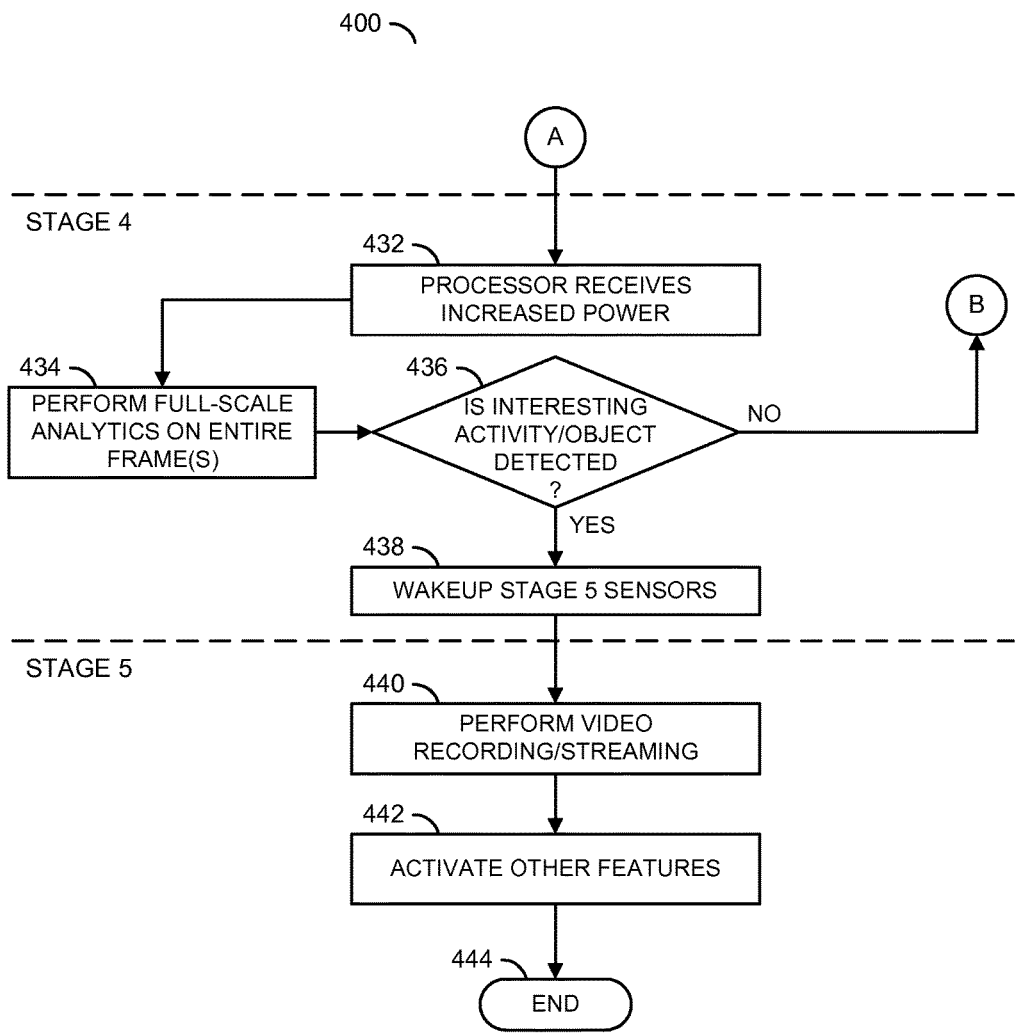
FIG. 6 is a flow diagram illustrating stage 4 and stage 5 of a method for implementing a multi-stage sensor architecture.

Referring to FIG. 6, stage 4 and stage 5 of the method 400 is shown. Stage 4 and stage 5 of the method 400 generally comprise a step (or state) 432, a step (or state) 434, a decision step (or state) 436, a step (or state) 438, a step (or state) 440, a step (or state) 442, and a step (or state) 444.

The method 400 may initiate stage 4 of the multi-stage architecture 100' at the state 432. In the state 432 the SOC processor 108' may receive increased power (e.g., from the battery 114). The state 434 may perform full-scale analytics on entire video frame(s). Next, the method 400 may move to the decision state 436. If the decision state 436 determines an interesting activity and/or object has not been detected, the method 400 may return to stage 1 at the state 404. If the decision state 436 determines an interesting activity and/or object has been detected, the method 400 may move to the state 438. The state 438 may wakeup the stage 5 sensors. Next, the method 400 may move to the state 440.

The method 400 may initiate stage 5 of the multi-stage architecture 100' at the state 440. The state 440 may perform video recording and/or streaming. The state 442 may activate other features of the multi-stage architecture 100'. Next, the method 400 may move to the state 444. The state 444 may end the method 400.

Generally, in each of the sensor stages $102a$-$102n$, the sensors corresponding to the currently active sensor stage may be active (e.g., consuming full, or nearly full, power). In some embodiments, the sensors that do not correspond to the currently active sensor stage may be off and/or operating in a standby (e.g., low power and/or idle) mode. For example, the PIR sensor 150 may correspond to the sensor stage $102a'$ and operate in an active mode (e.g., detecting activity) when the sensor stage $102a'$ is the currently active sensor stage and operate in a standby mode when the sensor stage $102b'$ is the currently active sensor stage. In some embodiments, the sensors that do not correspond to the currently active sensor stage may remain active after the multi-stage sensor architecture 100' moves to a next sensor stage. For example, the PIR sensor 150 may correspond to the sensor stage $102a'$ and operate in an active mode (e.g., detecting activity) when the sensor stage $102a'$ is the currently active sensor stage and remains in the active mode when the MCU 106' activates subsequent sensor stages (e.g., the sensor stage $102b'$, the sensor stage $102c'$, the sensor stage $102n'$, etc.).

The sensor stages $102a$-$102n$ may represent a combination of different hardware (e.g., a group of sensors and/or components) operating in an active state. In some embodiments, the sensor stages $102a$-$102n$ may represent a particular component operating at a different power stage (or evaluation stage, or decision-making stage). For example, the sensor stage $102i'$ may comprise the MCU 106', the microphone sensor 154 and the ADC 156 operating in an active state. In another example, the sensor stage $102j'$ may comprise the MCU 106', the microphone sensor 154 and the SOC processor 108' operating in an active state, with the SOC processor 108' operating in a first power stage (e.g., operating with limited power consuming video processing features such as performing analysis on regions of video frames). In yet another example, the sensor stage 102k' may comprise the MCU 106', the microphone sensor 154 and the SOC processor 108' operating in an active state, with the SOC processor 108' operating in a second power stage (e.g., operating with full, or nearly full power consuming video processing features). Generally, the group of sensors corresponding to the same sensor stage may be activated/deactivated (e.g., powered on and/or powered off) together. The components of each of the sensor stages 102a-102n and/or the power stages of each of the components in each of the sensor stages 102a-102n may be varied according to the design criteria of a particular implementation.

The MCU 106' may remain active in each of the sensor stages 102a'-102n'. The MCU 106' may be a low power device and control the activation and/or deactivation of the sensors corresponding to each of the sensor stages 102a'-102n'. An amount of power consumed by each of the sensor stages 102a'-102n' may be used to determine the order in which the sensor stages 102a'-102n' may be activated. For example, the MCU 106' may organize and/or prioritize an order of activation of the sensor stages so that the power consumption associated with each of the sensor stages 102a'-102n' is from lowest to highest.

The combination of sensor stages used for providing enough information to satisfy the confirmation threshold before enabling a stage of the camera system 100 that operates at full, or nearly full, functionality may be varied according to the design criteria of a particular implementation. The confirmation threshold may be pre-configured to avoid and/or prevent false wakeups (e.g., activation) of the video processor 108. Regardless of the combination of sensor stages utilized, the camera system 100 may follow the multi-stage approach of turning on higher-power elements (e.g., sensor stages and/or power stages) to perform stronger false motion (or false positive) hypothesis testing and, only if the filter (e.g., the confirmation threshold) of the current sensor stage is passed, proceeding to enable higher-power elements (e.g., sensor stages and/or power stages). Each subsequent stage may have a higher confirmation threshold.

The functions performed by the diagrams of FIGS. 3-6 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
    a first sensor configured to generate a first signal in response to a detecting first type of non-video activity;
    a second sensor configured to generate a second signal in response to a detecting second type of non-video activity;
    a video processor configured to operate in one of a plurality of power consumption stages, wherein (i) a first power consumption stage waits for a wakeup signal and (ii) a second power consumption stage is configured to activate one of a plurality of power consuming video processing features of said video processor in response to said wakeup signal; and
    a controller configured to (i) generate a first intermediate signal if said first type of non-video activity is detected and (ii) generate said wakeup signal if (a) said first intermediate signal is present and (b) said second signal relates to said first signal, wherein (i) said power consuming video features comprise (a) detecting objects in a region of video frames of a video signal and (b) processing said video signal for recording and (ii) said video signal is processed for recording if said objects detected in said video confirm said non-video activity detected by said second sensor when detecting said second signal.

2. The apparatus according to claim 1, wherein said second signal relates to said first signal when said second type of activity meets a confirmation threshold for said first type of activity.

3. The apparatus according to claim 2, wherein said confirmation threshold is pre-configured to avoid false wakeups of said video processor.

4. The apparatus according to claim 1, wherein (i) a video sensor is configured to generate said video signal from a targeted view of an environment and (ii) said second sensor is configured to determine whether a suspected activity is within a field of view of said video sensor.

5. The apparatus according to claim 1, wherein (i) said detecting of said objects is part of a confirmation threshold for activating said power consuming video features of said video processor and (ii) said region of said video frames is selected based on said second signal.

6. The apparatus according to claim 1, wherein said power consuming video features of said video processor further comprise (i) performing analytics on full video frames of said video signal and (ii) detecting objects in said video frames.

7. The apparatus according to claim 1, wherein said apparatus further comprises a memory configured to store video frames of said video signal for analysis by said video processor.

8. The apparatus according to claim 1, wherein said power consuming video processing features of said video processor further comprise at least one of activating a capture of said video signal, video analysis, video recording, network streaming and encryption.

9. The apparatus according to claim 1, wherein said second sensor is configured to operate in a standby mode until said first intermediate signal is generated.

10. The apparatus according to claim 9, wherein said second sensor has a higher power consumption than said first sensor.

11. The apparatus according to claim 1, further comprising a third sensor configured to generate a third signal in response to a third type of activity, wherein said controller is further configured to (i) generate a second intermediate signal if said second type of activity is detected and (ii) generate said wakeup signal if (a) said first intermediate signal and said second intermediate signal are present and (b) said third signal relates to said first signal and said second signal.

12. The apparatus according to claim 11, wherein said third sensor has a higher confirmation threshold than said second sensor.

13. The apparatus according to claim 1, wherein (i) said first sensor is part of a first sensor stage, (ii) said second sensor is part of a second sensor stage and (iii) said first sensor stage and said second sensor stage each comprise a plurality of sensors.

14. The apparatus according to claim 13, wherein (i) said sensors of said first sensor stage are powered on and powered off together and (ii) said sensors of said second sensor stage are powered on and powered off together.

15. The apparatus according to claim 13, wherein said first sensor stage and said second sensor stage are activated in an order such that power consumption is from lowest to highest.

16. The apparatus according to claim 1, wherein said first sensor is implemented as an audio sensor configured to detect changes in an audio signal, said changes comprising a change to a volume level.

17. The apparatus according to claim 1, wherein (i) said first sensor is implemented as a passive infrared sensor and said second sensor is implemented as a plurality of microphones configured to detect audio signals and (ii) a digital signal processor is configured to calculate a direction corresponding to said audio signals detected by said plurality of microphones.

18. The apparatus according to claim 1, wherein said apparatus further comprises a memory configured to store said first and second signals from said first sensor and said second sensor.

19. The apparatus according to claim 1, wherein said apparatus implements a multi-stage wakeup for a battery-powered camera.

20. The apparatus according to claim 1, wherein said controller consumes less power than said video processor.

* * * * *